United States Patent
Zhang et al.

(10) Patent No.: US 11,742,921 B2
(45) Date of Patent: Aug. 29, 2023

(54) SYSTEM AND METHOD FOR BEAM MANAGEMENT PROCEDURE CONFIGURATION

(71) Applicant: Apple Inc., Cupertino, CA (US)

(72) Inventors: Yushu Zhang, Beijing (CN); Huaning Niu, Milpitas, CA (US); Wook Bong Lee, San Jose, CA (US); Alexei Davydov, Nizhny Novgorod (RU); Guotong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 17/510,139

(22) Filed: Oct. 25, 2021

(65) Prior Publication Data

US 2022/0069882 A1    Mar. 3, 2022

Related U.S. Application Data

(63) Continuation of application No. 16/498,805, filed as application No. PCT/US2018/025629 on Apr. 2, 2018, now Pat. No. 11,159,217.
(Continued)

(51) Int. Cl.
 *H04B 7/06* (2006.01)
 *H04W 16/28* (2009.01)
(Continued)

(52) U.S. Cl.
 CPC ......... *H04B 7/0628* (2013.01); *H04B 7/0626* (2013.01); *H04B 7/0695* (2013.01);
(Continued)

(58) Field of Classification Search
 CPC .. H04B 7/0628; H04B 7/0626; H04B 7/0695; H04W 72/23; H04W 72/046;
(Continued)

(56) References Cited

U.S. PATENT DOCUMENTS

2015/0162966 A1    6/2015   Kim et al.
2017/0026938 A1    1/2017   Onggosanusi et al.
(Continued)

FOREIGN PATENT DOCUMENTS

KR    1020170020187 A    2/2017
WO      2016108483 A1    7/2016
(Continued)

OTHER PUBLICATIONS

Ericsson; "Further Details of CSI Framework"; 3GPP TSG-RAN WG1 #88bis R1-1705895; Spokane, USA; Apr. 3, 2017; 7 pages.
(Continued)

*Primary Examiner* — Melvin C Marcelo
(74) *Attorney, Agent, or Firm* — Kowert, Hood, Munyon, Rankin & Goetzel, P.C.

(57) ABSTRACT

Systems and methods of beam reporting for multiple DL processes are described. A UE receives a beam management processes configuration that provides information about beam management reference signals for beam management procedures. The UE transmits a UE capability report that indicates beam management capabilities of the UE and, later, an indication of whether the UE intends to engage in beam refinement. The UE measures the beam management reference signals and receives a beam reporting message that indicates at least one of the beam management procedures to report. In response, the UE transmits the beam report. The beam report contains beam management reference signal measurements of the beam management procedures indicated by the beam reporting message.

20 Claims, 9 Drawing Sheets

Related U.S. Application Data

(60) Provisional application No. 62/480,098, filed on Mar. 31, 2017.

(51) Int. Cl.

| | | |
|---|---|---|
| *H04L 5/00* | (2006.01) | |
| *H04W 24/10* | (2009.01) | |
| *H04W 72/044* | (2023.01) | |
| *H04W 84/04* | (2009.01) | |
| *H04W 72/23* | (2023.01) | |

(52) U.S. Cl.
CPC ........... *H04L 5/0048* (2013.01); *H04W 16/28* (2013.01); *H04W 24/10* (2013.01); *H04W 72/046* (2013.01); *H04W 72/23* (2023.01); *H04W 84/045* (2013.01)

(58) Field of Classification Search
CPC ... H04W 16/28; H04W 24/10; H04W 84/045; H04L 5/0048
See application file for complete search history.

(56) References Cited

U.S. PATENT DOCUMENTS

| | | |
|---|---|---|
| 2017/0373743 A1 | 12/2017 | Park et al. |
| 2019/0394664 A1 | 12/2019 | Sun |
| 2020/0028649 A1 | 1/2020 | Zhou et al. |
| 2020/0204234 A1 | 6/2020 | Zhu et al. |
| 2020/0267804 A1 | 8/2020 | Kakishima et al. |

FOREIGN PATENT DOCUMENTS

| | | |
|---|---|---|
| WO | 2016187744 A1 | 12/2016 |
| WO | 2017052330 A1 | 3/2017 |

OTHER PUBLICATIONS

Guangdong Oppo Mobile Telecom; "CSI-RS design for NR"; 3GPP TSG RAN WG1 NR-Adhoc R1-1700551; Spokane, USA, Jan. 16, 2017, 3 pages.

Extended European Search Report for Patent Application No. EP18778223; dated Nov. 4, 2020, 14 Pages.

"Discussion on DL Beam Management Procedure p. 2 and p. 3", R1-1612509, 3 GPP TSG RAN WG1, Meeting #87, Reno, USA, [Online] Retrieved from: <http://www.3gpp.org/ftp/tsg_ran/WG1_RL1/TSGR1_87/Docs/>, Nov. 4, 2016, 4 pgs.

International Search Report and Written Opinion, International Application No. PCT/US2018/025629, dated Jul. 18, 2018, 15 pgs.

"UL Beam Management Procedures", R1-1702942, 3GPP TSG RAN WG1, Meeting #88, Athens, Greece, [Online] Retrieved from: <http://www.3gpp.org/ftp/tsg_ran/WG1_RL1/TSGR1_88/Docs/>, Feb. 7, 2017.

"Views on Beam Management Procedure", R1-1611817, 3GPP TSG RAN WG1, Meeting #87, Reno, USA, [Online] Retrieved from: <htpp://www.3gpp.org/ftp/tsg_ran_WG 1_RL1 /TSGR1_87/Docs/>.

Lg Electronics, "Discussion on CSI Acquisition Framework", R1-1700476, 3GPP TSG RAN WG1, NR Ad-Hoc Meeting; Spokane, USA, Jan. 2017; 5 pgs.

NTT Docomo, Inc.; "Workplan for Study on NR Access Technology", R1-1700589, 3GPP TSG RAN1 NR Ad-Hoc Spokane, USA; Jan. 2017; 101 pgs.

European Office Action; Application No. 18778223.0; dated Nov. 3, 2021, 12 pgs.

SYSTEM AND METHOD FOR BEAM MANAGEMENT PROCEDURE CONFIGURATION

PRIORITY CLAIM

This application is a continuation of U.S. patent application Ser. No. 16/498,805, filed Sep. 27, 2019, which is a U.S. National Stage Filing under 35 U.S.C. 371 from International Application No. PCT/US2018/025629, filed Apr. 2, 2018 and published in English as WO 2018/183995 on Oct. 4, 2018, which claims the benefit of priority to U.S. Provisional Patent Application Ser. No. 62/480,098, filed Mar. 31, 2017, entitled "BEAM MANAGEMENT PROCEDURE CONFIGURATION," each of which is incorporated herein by reference in its entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks (RANs). Some embodiments relate to beamforming in cellular and wireless local area network (WLAN) networks, including Third Generation Partnership Project Long Term Evolution (3GPP LTE) networks and LTE advanced (LTE-A) networks as well as legacy networks $4^{th}$ generation (4G) networks and $5^{th}$ generation (5G) networks. Some embodiments relate to beam management in 5G systems.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. As a result, 3GPP LTE systems continue to develop, with the next generation wireless communication system, 5G, to improve access to information and data sharing. 5G looks to provide a unified network system that is able to meet vastly different and sometime conflicting performance dimensions and services driven by disparate services and applications while maintaining compatibility with legacy UEs and applications.

Various techniques continue to be developed to increase the amount of data able to be conveyed between a next generation NodeB (gNB) and UEs.

BRIEF DESCRIPTION Of THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
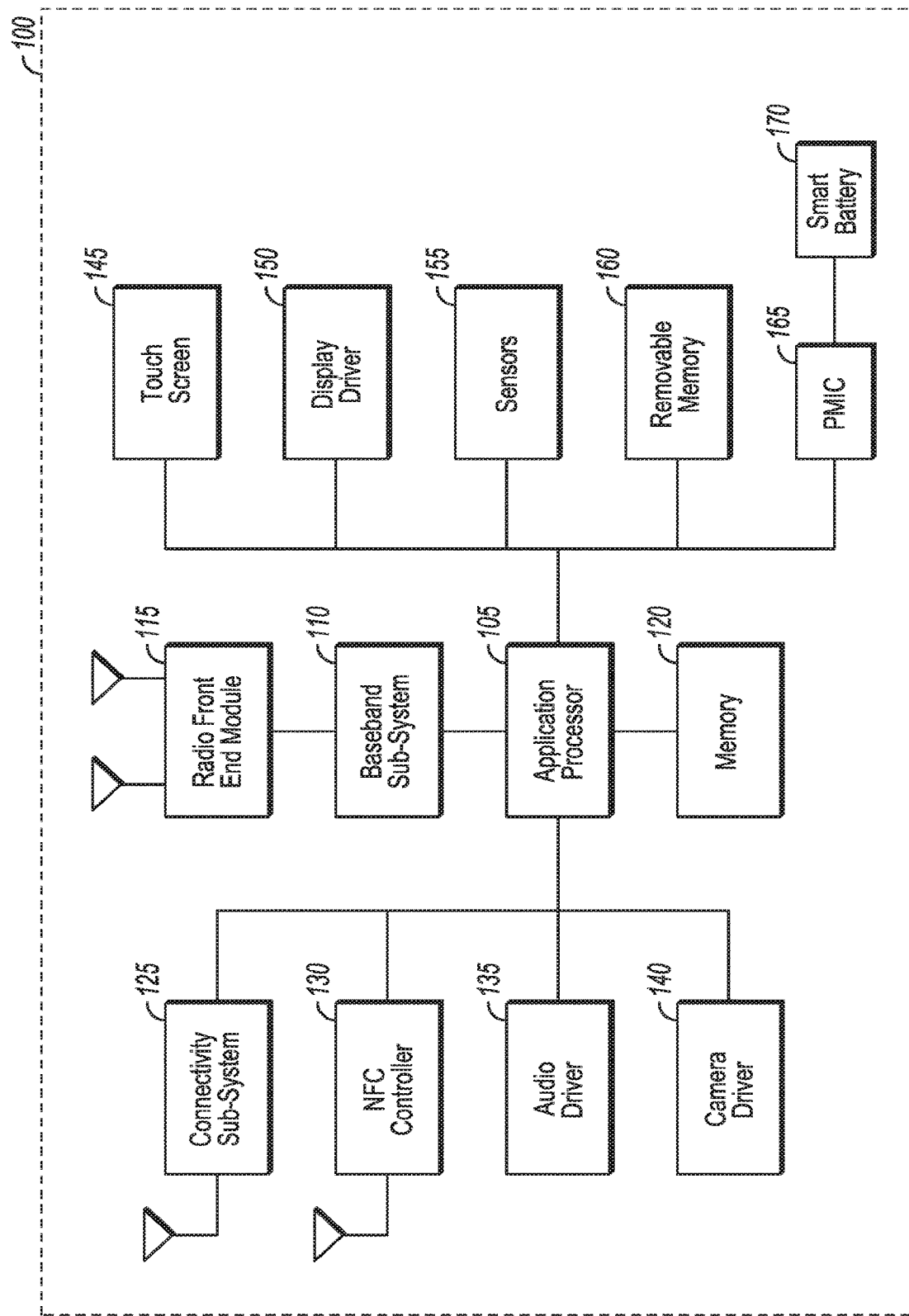
FIG 1 illustrates a UE in accordance with some embodiments.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

Figure 2:
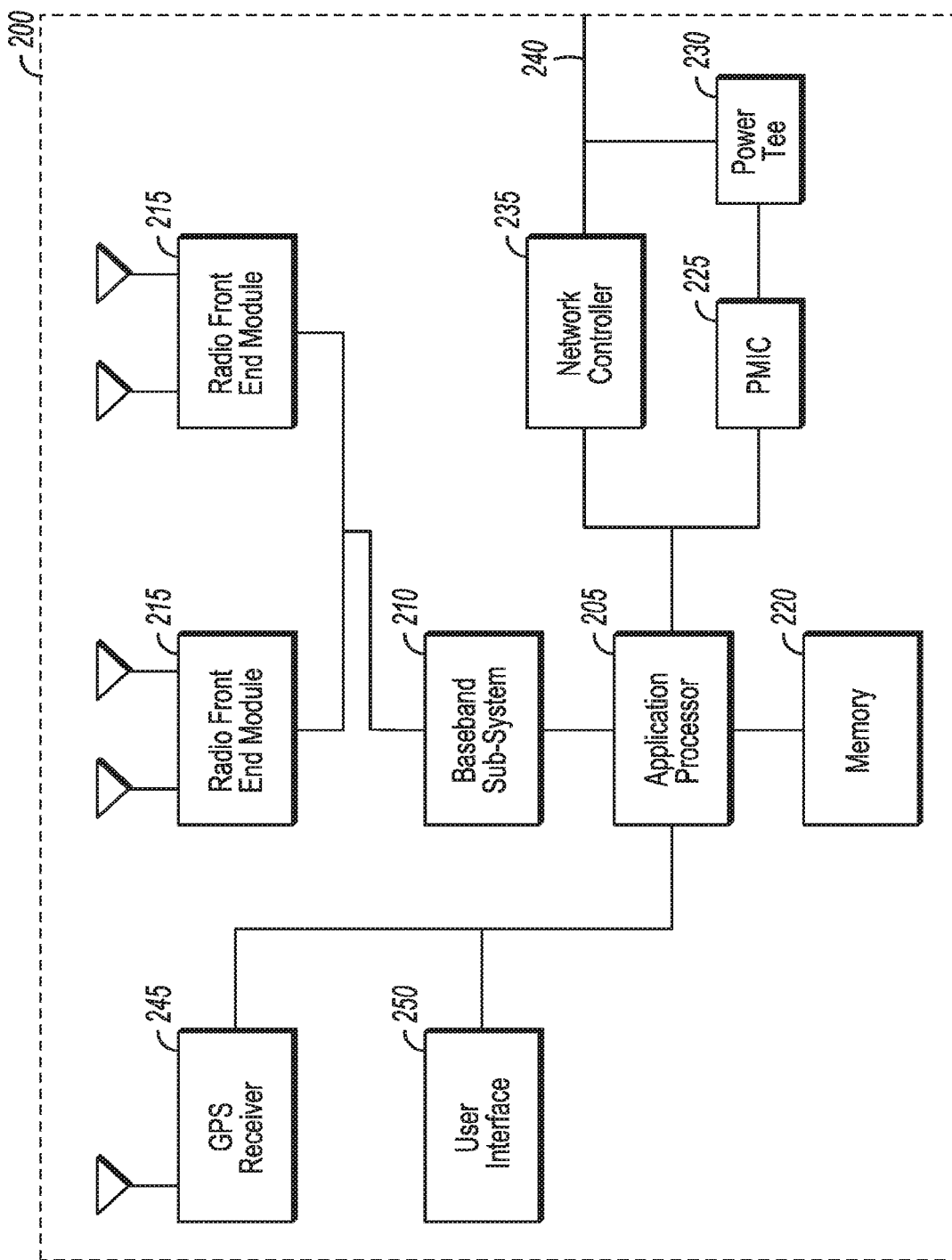
FIG. 2 illustrates a base station or infrastructure equipment radio head in accordance with some embodiments.

In some aspects, baseband processor 110 may be implemented, for example, as a solder-down substrate including one or more integrated circuits, a single packaged integrated circuit soldered to a main circuit board, and/or a multi-chip module containing two or more integrated circuits FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, I²C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more back up power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnay a Navigatsionnaya Sputnikovava Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
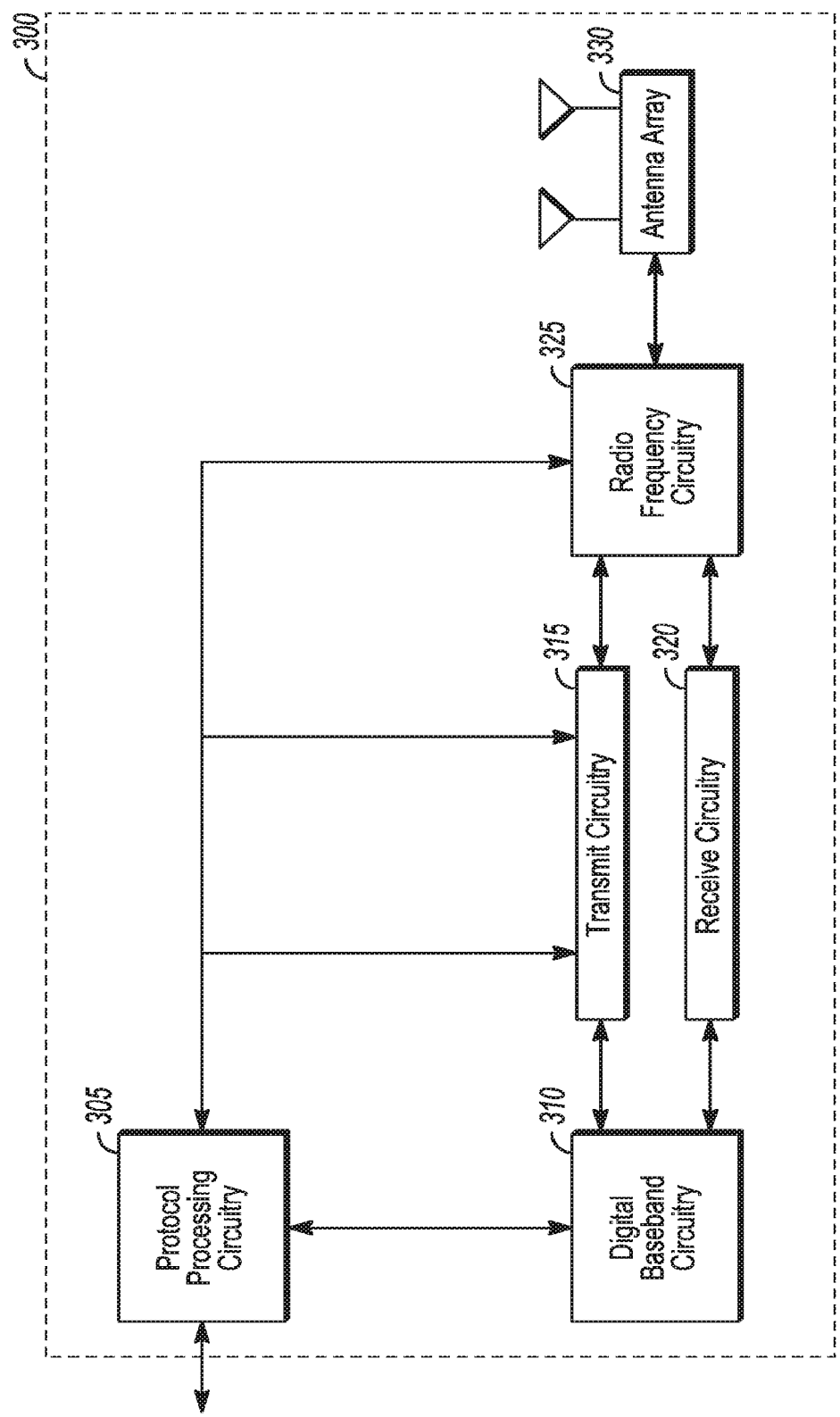
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, If processing circuitry. baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system digital I/O sub-system, digital baseband interface sub-system and audio sub-system. In an example aspect, the baseband processing subsystem may include one or more of each of an accelerator subsystem, buffer memory, interconnect subsystem, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as $I^2C$, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (I/Q) samples.

In an aspect, the controller sub-system may include one or more of each of control and status registers and control state machines. In an aspect, the control and states registers may be accessed via a register interface and may provide for one or more of starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
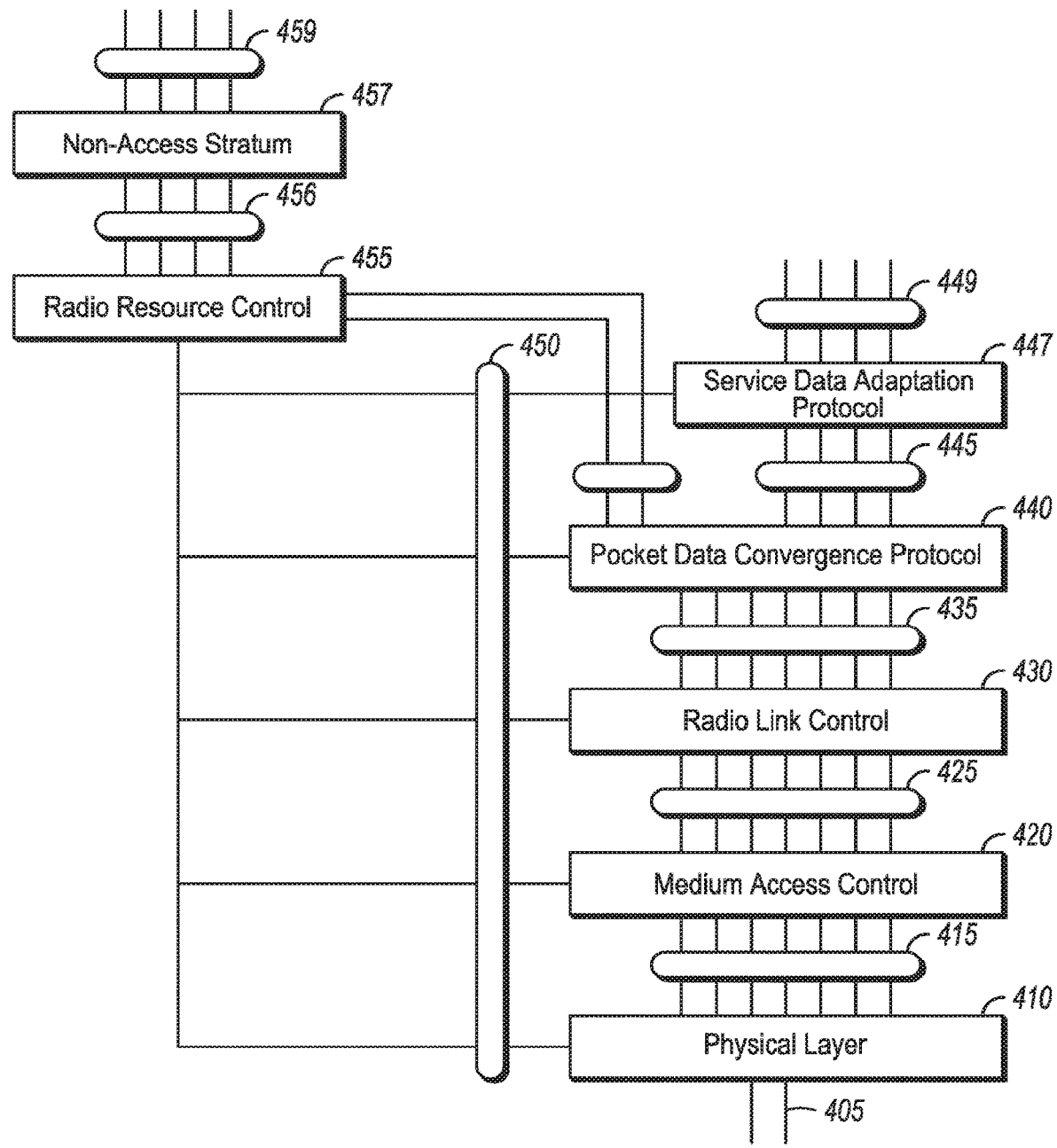
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspect, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
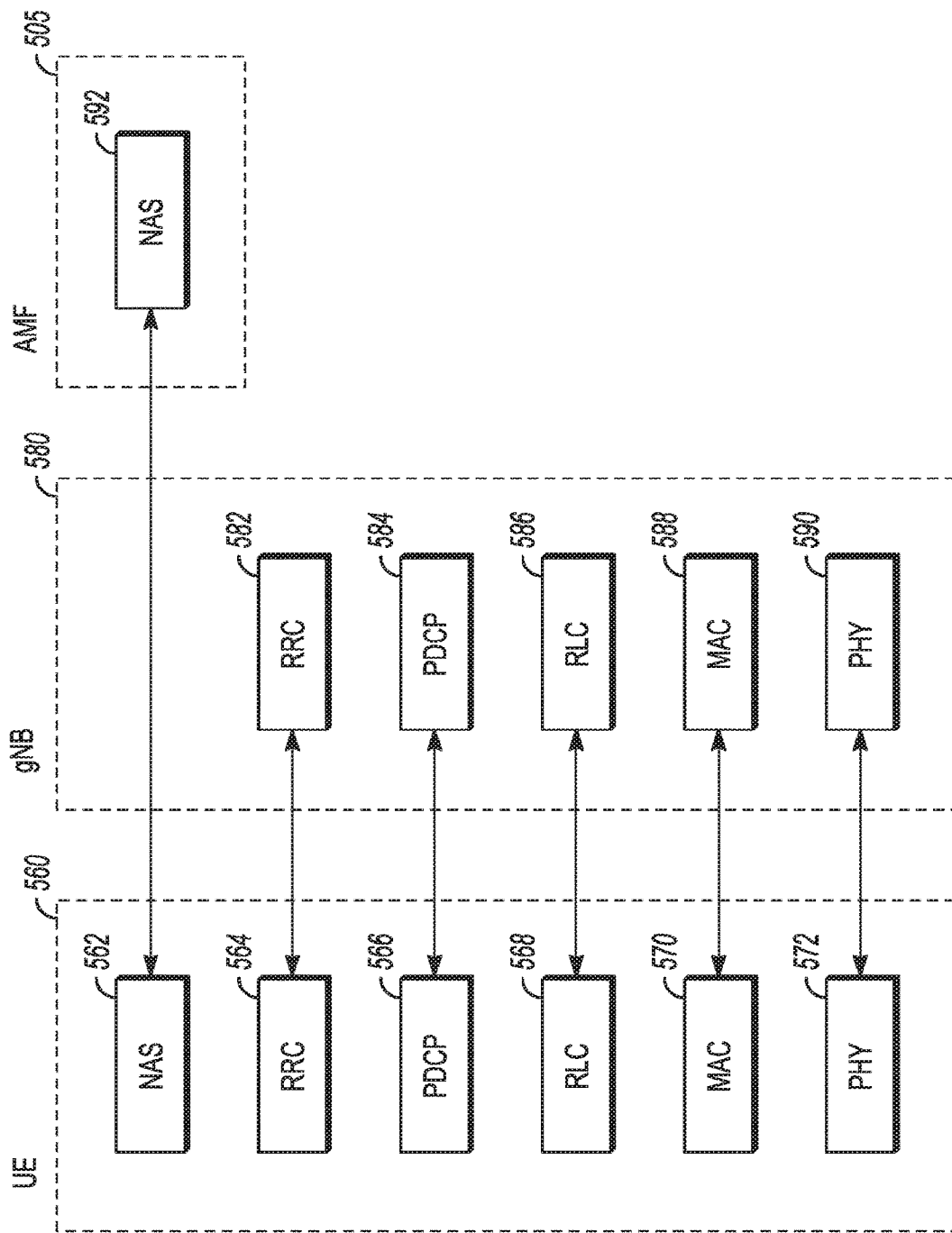
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 504, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes which may be 1 ms in duration. According to come us peels, each subframe may consist of one or more slots. In some aspects, the time intervals may be represented in units of $T_s$. According to some aspects, $T_s$ may be defined as $1/(30,720 \times 1000)$ seconds. According to some aspects, a radio frame may be defined as having duration 30,720, $T_s$, and a slot may be defined as having duration 15,360, $T_s$. According to some aspects, $T_s$ may be defined as $$T_s = 1/(\Delta f_{max} \cdot N_f),$$

where $\Delta f_{max} = 480 \times 10^3$ and $Nf = 4{,}096$. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In art aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i) = d(i)$$

and the layer mapping for two layers may be expressed as:

$$x^{(0)}(i) = d(2i)$$

$$x^{(1)}(i) = d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(i) \ldots x^{(v-1)}(i)]^T$$

where i represents a sequence number index in the range 0 to $M_{symb}^{layer} - 1$ he output is represented as a block of vectors:

$$[z^{(0)}(i) \ldots z^{(P-1)}(i)]^T$$

where i represents a sequence number index in the range 0 to $M_{symb}^{ap} - 1$. The preceding operation may be configured to include one of direct mapping using a single antenna port, transmit diversity using space-time block coding, or spatial multiplexing.

In an aspect, each stream of preceded symbols may be input to a resource mapper which generates a stream of resource mapped symbols. The resource mapper may map preceded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j 2\pi f_k(t - T_{sym} - \tau_k)]$$

Where $p_T(t)$ is a prototype filler function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, l) where k is the index number of subcarrier, in the range 0 to N.M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
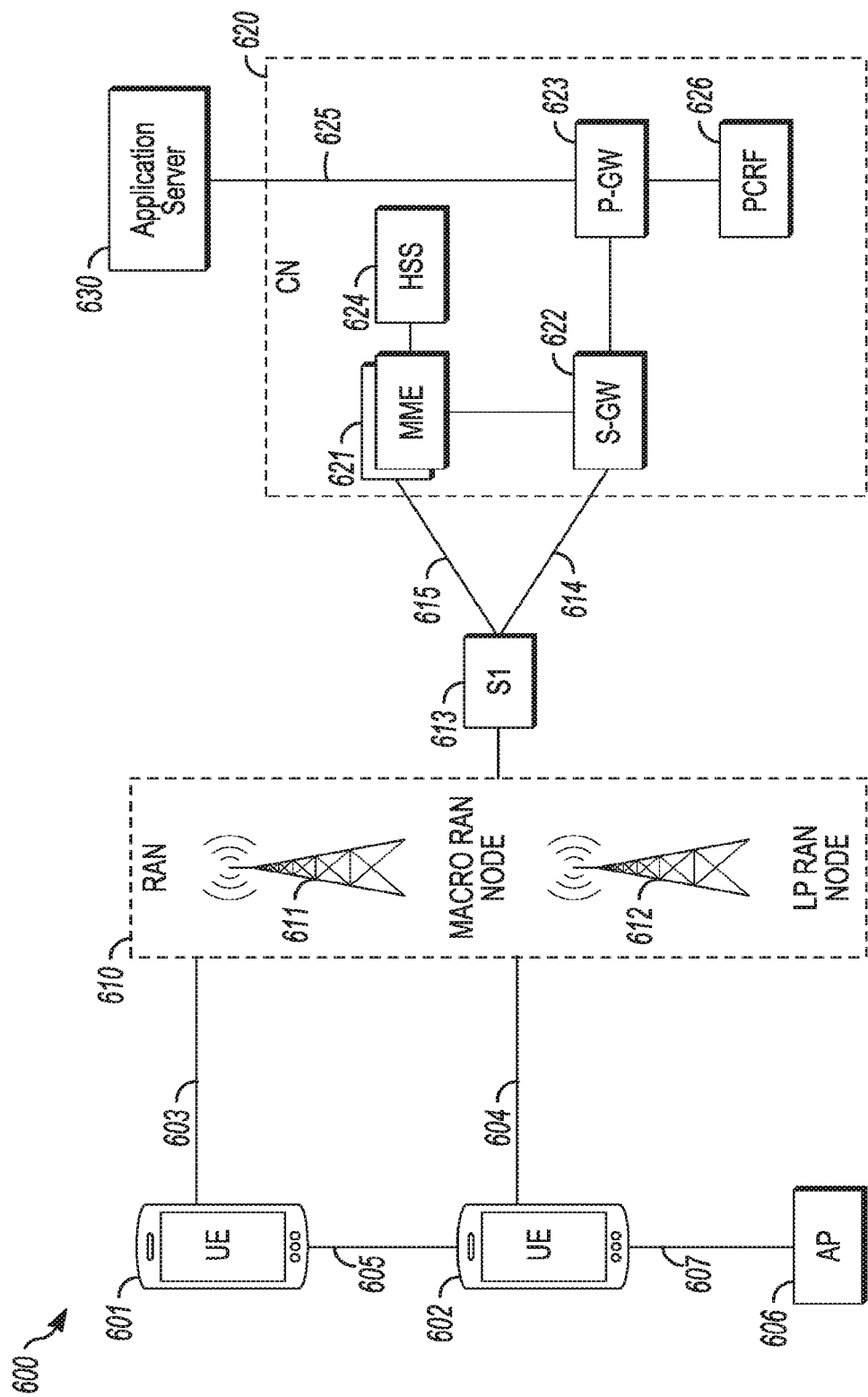
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one of more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN). Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limned to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limned in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a 5GC network, or some other type of CN. In this embodiment, the S1 interface 613 is split into two parts, the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 61, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LIE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session, a Home PCRF (H-FCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The component of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASTC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

As above, a 5G device may include physical layer circuitry for transmitting and receiving signals using one or more antennas. The antennas on the UE or gNB may permit the device to use beamforming. The beamforming may be provided via one or more of a directional antenna, phased array antennas, or antennas with multiple apertures for directional transmissions. Tracking may be used to train an analog beamforming matrix to obtain an optimal direction to communicate and perform wideband channel sounding, which can be used in physical control channel decoding and digital beamforming refinement.

In the LTE system, various types of reference signals (RS) may be transmitted by the gNB for a UE to measure. The reference signals may include, for example, cell-specific reference signals (CRS-RS), UE-specific reference signals (DMRS) or Channel State Information-Reference Signals (CSI-RS). The CRS-RS may be used for cell search and initial acquisition, demodulation and channel quality estimation. The DMRS may be used for PDSCSH demodulation by the UE, as well as for handover. The number and type of downlink reference signals has increased with newer generations of LTE networks, which has led to issues due to the increased number of antennas, antenna panels and antenna ports. In particular, the gNB and/or UE may use specific RSs in beamforming to increase data throughput or quality.

One of the aspects of beamforming is beam management. Beam management is described in 3GPP TR.38.802. Beam management may include a set of L1/L2 procedures to acquire and maintain a set of Transmission Reception Points (TRPs) (gNBs) and/or UE beams that can be used for DL and UL transmission/reception. Beam management may include beam determination for a TRP or UE to select its own Tx/Rx beams, beam measurement for the TRP or UE to measure characteristics of received beamformed signals, beam reporting for UE to report information of beamformed signal(s) based on beam measurement, and beam sweeping to cover a spatial area, with beams transmitted and/or received during a time interval in a predetermined way.

In some embodiments, beam management may include 3 types of DL beam management procedures, each of which may be associated with a set of one or more reference signals, P-1 may be used for initial gNB-UE beam pair acquisition, P-2 may be used for gNB beam refinement, and P-3 may be used for UE beam refinement. In some embodiments, the beam reporting and the beam management reference signal may be decoupled. The beam reporting may occur after all three procedures take place, which in turn may cause ambiguity in the determination between live beam reporting and beam management procedure.

In addition, in some UEs, such as MTC UEs or other UEs with limited processing power, the AGC may have a limited range. However, to measure the top 6 Tx beams, it may be desirable for the AGC to reserve a 5 bit margin and to measure the top 6 Rx beams, it may be desirable for the AGC to reserve a 3 bit margin, since the maximum gap between the top 6 Tx beams can be 14 dB and between the top 6 Rx beams can be 9 dB. Therefore, to measure P-1, the UE may reserve a 5+3=8 bit margin. However, some UEs may be unable to measure P-1 as a result of a bit width limitation in the AGC. In some embodiments, the UE may only have an omni-directional antenna, which may negate the effectiveness of P-3. If beam correspondence can be assumed on the gNB side, the gNB may select the SRS for beam refinement. It thus may be desirable to determine how to configure the beam management procedure. In various embodiments beam forming management may include UE capability and recommendation, a gNB configuration and beam reporting for multiple procedures.

The measurement and beam reporting for all the beam management procedures may be based on Reference Signal Received Power (RSRP) or Reference Signal Received Quality (RSRQ) of the associated set of reference signals. As the beam management reference signal and beam reporting for each procedure may be decoupled, when the gNB triggers beam reporting by the UE, which procedure is to be captured may be unclear.

In some embodiments, multiple reference signal processes may be used for beam management. As above, in some embodiment, the reference signals may be CSI-RS, which may be used for each beam of the procedure. In other embodiments, other reference signals, such as demodulation reference signals (DMRS) or specialized reference signals may be used. The one or more of the CSI-RS processes may be configurable. This is to say that at least one of the following may be configurable by the gNB for a particular process: the number of symbols, the number of sub-time units within one symbol (e.g. configurable repetition factors and/or numerologies), the transmission mechanisms (e.g., cell-specific, UE specific or UE-group specific, periodic or aperiodic), the number of CSI-RS resources, the number of CSI-RS antenna ports, the number of links, the reporting settings, the number of antenna ports per beam, or the interference measurement resource (IMR) setting. Which CSI-RS process parameters are provided by the CSI-RS configuration may be the same or may be different among the CSI-RS processes. In some embodiments, at least one default CSI-RS process with a periodic and cell-specific transmission mechanism may be included in the CSI-RS configuration.

In one example, K is the number of Tx beams and N is the number of Rx beams, where K and N are independent. In the following discussion, K and N are assumed for convenience to be the same number of beams for each process. In general, however, the number of beams for the different processes are not so restricted.

In one example of CSI-RS resource setting, the P-1 process may have K CSI-RS resources. Each CSI-RS resource may have N ports. During each CSI-RS resource, the gNB Tx beam may not change. The gNB may form different beams for different CSI-RS resources. The UE may report a CSI-RS resource ID for Tx beam selection. In some embodiments, the UE may perform a Rx beam sweep within the CSI-RS resource.

The P-2 process may configure K CSI-RS resources with 1 port each. The gNB may form different beams for the different CSI-RS resources. The UE may report a CSI-RS resource ID for Tx beam selection.

The P-3 process may configure 1 CSI-RS resource with N ports. During the CSI-RS resource, the gNB Tx beam may not change. The UE may perform a Rx beam sweep within the CSI-RS resource to find the best Rx beam.

In another example of CSI-RS resource setting, the P-1 process may have N CSI-RS resources. Each CSI-RS resource may have K ports. During each CSI-RS resource, the same gNB Tx beam max be used for the same port number for different CSI-RS ports. The gNB may form different beams for different CSI-RS resources. The UE may report a CSI-RS port number for Tx beam selection. The UE may perform a Rx beam sweep for each CSI-RS resource.

The P-2 process may configure 1 CSI-RS resource with K ports. The gNB may form different beams for the different CSI-RS ports. The UE may import a CSI-RS port number for Tx beam selection.

The P-3 process may configure N CSI-RS resources with 1 port. The UE may form different Rx beams to find the best Rx beam.

In some embodiments, the gNB may indicate the beam management reference signal type or beam management process ID when triggering beam reporting. The indication may be provided by the Downlink Control Information (DCI) of a PDCCH used to trigger the beam reporting. In some embodiments, the beam management reference signal type or beam management process ID can be indicated when triggering the transmission of the beam management reference signal in addition or instead.

Figure 7:
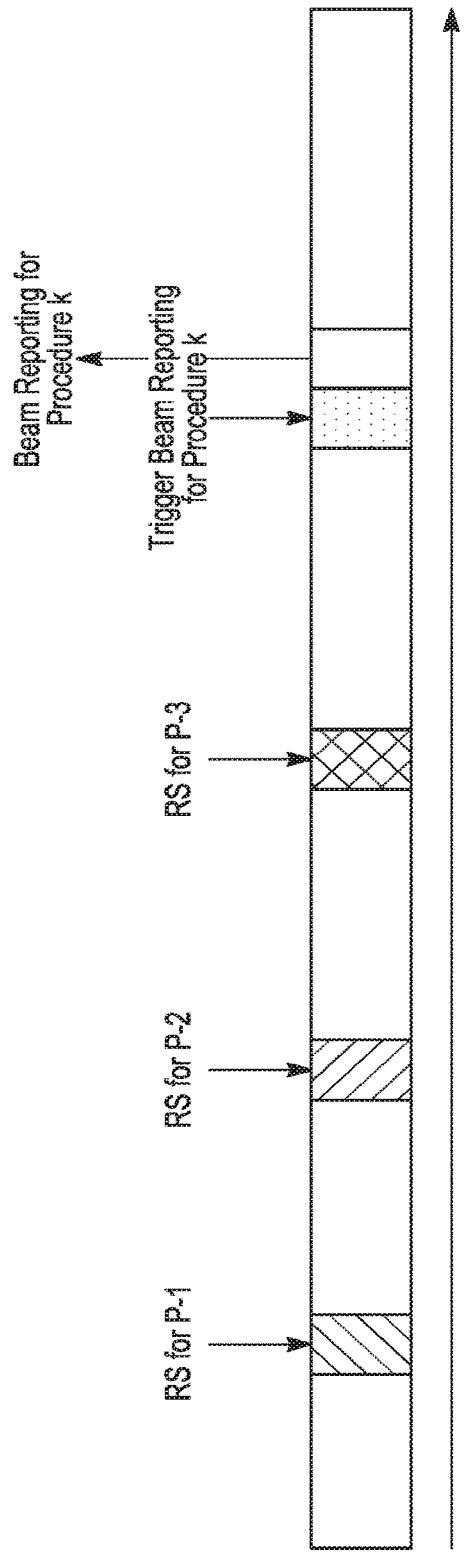
FIG. 7 illustrates single procedure based beam reporting in accordance with some embodiments.

In response to reception of the indication, the UE may report the measurement results for the latest received corresponding reference signal. This is shown in FIG. 7, which illustrates single procedure based beam reporting in accordance with some embodiments. The time and frequency resources that can be used by the UE to report the CSI may thus be controlled by the gNB. The UE and gNB may be shown in any of FIGS. 1-6. Other operations may occur during the time period indicated, but are not shown for convenience. Here, as in the other figures and descriptions, the transmitting entity may encode signals, such as the reference signals, for transmission so the receiving entity and the receiving entity may decode the signals prior to engaging in further processing of the signals. The reporting configuration for the CSI can be aperiodic (using the PUSCH) or periodic (using the PUCCH), and the CSI-RS resources can be periodic or aperiodic.

As shown in FIG. 7, the UE may provide beam reporting for the most recent procedure. In this embodiment, the UE may ignore beam reporting for procedures other than the most recent. In some embodiments, the beam reporting may be for procedure k. Procedure k may be indicated in the trigger from the gNB. Alternatively, procedure k may be a predetermined number of beams prior to the beam report (e.g., N where N>1, rather than 1 (the most recent). In other embodiments, the beam repotting may be for a single procedure that is within a predetermined time period prior to the beam reporting, in which the time period may be immediately prior to the beam reporting or in a window whose termination is a predetermined time prior to the beam reporting.

Figure 8:
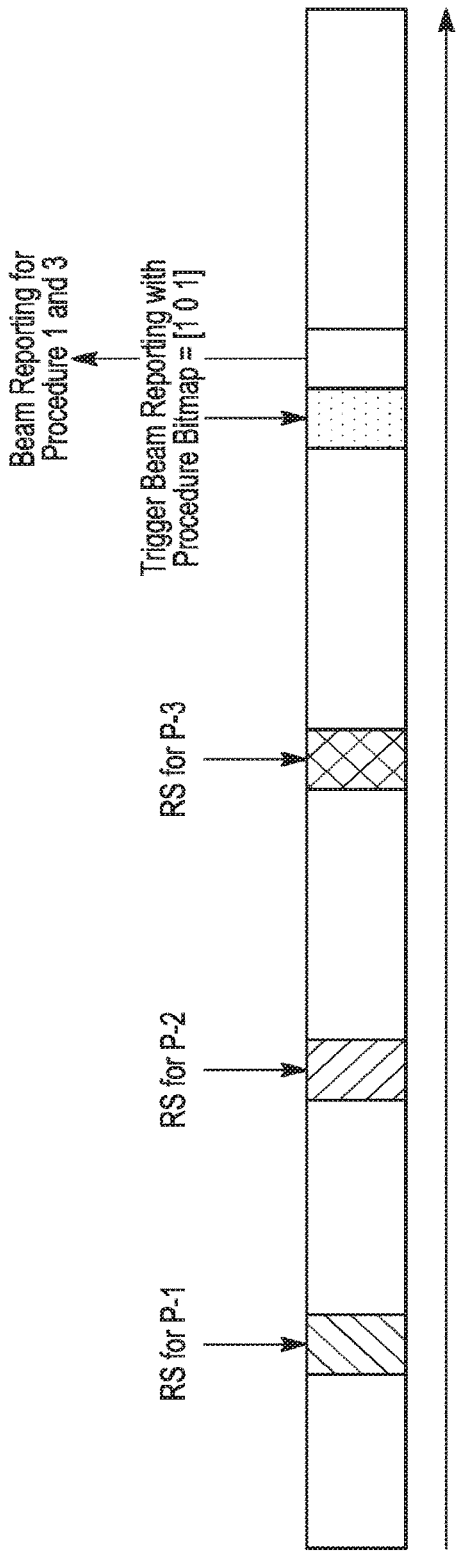
FIG. 8 illustrates multi-procedure based beam reporting in accordance with some embodiments.

Rather than merely reporting a single procedure, in other embodiments multiple procedures can be reported on using a single beam report. FIG. 8 illustrates multi-procedure based beam reporting in accordance with some embodiments. As above, the UE and gNB may be shown in any of FIGS. 1-6. Other operations may occur during the time period indicated, but are not shown for convenience.

In some embodiments, the gNB may use a bitmap to indicate a multi-procedure based beam reporting. For example, the bitmap may have 3 bits in which bit k is used to indicate procedure k, where value 0 may indicate the beam reporting for procedure k is not to be transmitted and value 1 may indicate the beam reporting is to be transmitted. Alternatively, in some embodiments the 3 different procedures immediately preceding the trigger may be automatically reported. In various embodiments, the order of reporting (e.g., which beam report is first) may be predetermined.

Figure 9:
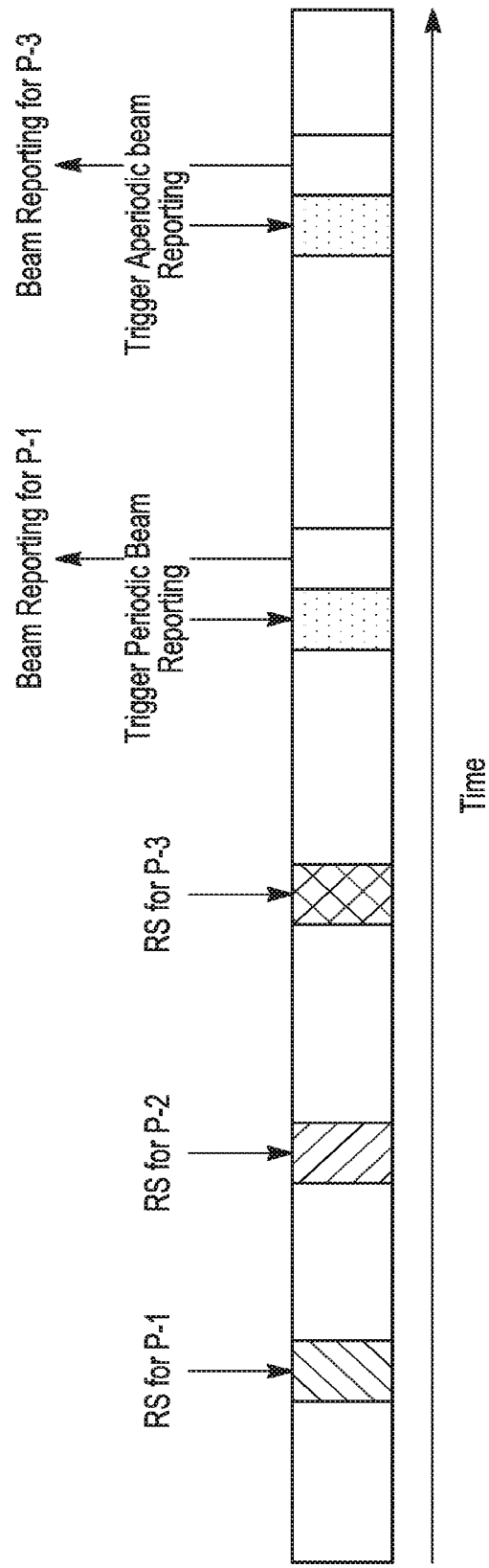
FIG. 9 illustrates periodic and aperiodic beam reporting in accordance with some embodiments.

In some embodiments, rather than perpetually reporting on one or multiple beams, either periodic or aperiodic beam reporting may be used. FIG. 9 illustrates periodic and aperiodic beam reporting in accordance with some embodiments. As above, the UE and gNB may be shown in any of FIGS. 1-6. Other operations may occur during the time period indicated, but are not shown for convenience.

As indicated, one or more of the beam management signals may be periodically reported and one or more of the beam management signals may be aperiodically reported. As shown in FIG. 9, the beam management signal P-1 can be a periodic beam management reference signal and the beam management signals P-2 and P-3 can be aperiodic beam management reference signals. Then when triggering the beam reporting, the gNB may indicate whether the beam reporting is targeting for a periodic reference signal or an aperiodic reference signal. In some embodiments, the indication may be provided by the DCI.

If the trigger is used to trigger a report for a periodic reference signal, the beam management P-1 based beam reporting may be used. That is, the measurements of the most recent P-1 procedure may be reported. Otherwise the UE may report the beam reporting for the latest beam management procedure (which may be selected by the DCI or higher layer signaling between P-2 and P-3). Note that thee order of the reference signal transmissions may be different from that shown in FIG. 9. For example, the reference signal for P-2 and P-3 may be transmitted after the beam reporting for P-1. In some embodiments, the periodic trigger may not be used to trigger reporting for aperiodic procedures and the aperiodic trigger may not be used to trigger reporting for periodic procedures.

Although shown in FIGS. 7-9 that the trigger and beam reporting occur adjacent in time, this may not be the case. If the trigger and beam reporting are separated in time, a reference signal may be transmitted between the beam reporting trigger and beam reporting slot. In this case, whether the beam reporting takes the intermediate reference signal into account may be pre-defined, configured by higher layer signaling, configured by the DCI or based on the UE implementation in various embodiments. In the last embodiment, the UE may be able to determine whether the reference signal is to be considered for beam reporting.

In some embodiments, the UE may always report the beam state for the latest beam management reference signal. Thus, the UE may report the beam state for the beam management P-3. Alternatively, the UE may report the beam state for all beam management procedures which have not been previously reported. In another embodiment, thee UE may select only certain beam procedures to report.

The beam reporting content may include some or all of various pieces of information. For example, the beam report may include the beam management reference signal type, process ID or subframe/slot index that is used to indicate the beam management procedure to be reported. The beam report may include the port index or CSI-RS resource index (CRI) for one or more of the beams. The beam report may also include the RSRP and or RSRQ for one or more of the beams.

Whether a UE is able to, or should, measure certain beam forming reference signals may be dependent on the particular UE or gNB. For example, a UE that has an AGC bit width limitation to measure the P-1, and may be unable to measure the reference signal for P-1. Also, a UE may only have an omni- directional antenna, rather than one or more directional antennas, or may desire to switch to use of omni-directional antenna from a directional antenna to achieve a high rank transmission. In this case, the UE may not desire to measure the P-3 reference signal, for example, to conserve resources. In addition, when P-2 should be used may also be determined by the beam correspondence and implementation of the gNB.

Figure 10:
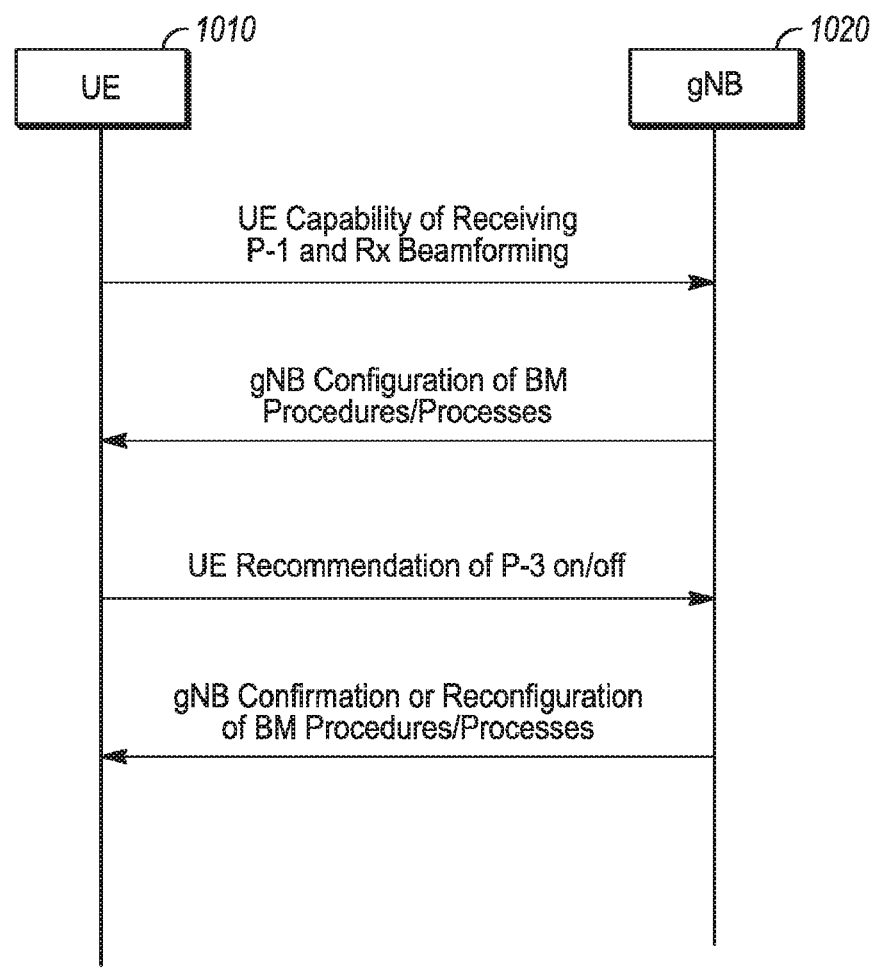
FIG. 10 illustrates a beam management procedure configuration in accordance with some embodiments.

FIG. 10 illustrates a beam management procedure configuration in accordance with some embodiments. As above, the UE 1010 and gNB 1020 may be shown in any of FIGS. 1-6. Other operations may occur during the time period indicated, but are not shown for convenience. As shown in FIG. 10, the UE 1010 may report capability information to the gNB 1020 in a UE capability report. The capability information may include capability of the UB 1010 related specifically to beam forming. For example, the capability information may include whether the UE 1010 can measure P-1. The capability information may also or instead include whether the UE 1010 wishes to perform beam refinement (P-3). The capacity information may be provided to the gNB 1020 during initial attachment or reconnection, for example. The capability information may in addition indicate whether Rx beam forming is able to be used by the UE 1010. The gNB 1020 may respond to the UB capability information with a confirmation of which beamforming procedures are to be used.

In some cases, such as when the link budget for the UE 1010 is good, the UE 1010 may switch to use of an omni-directional antenna to achieve a high rank transmission. In this case, Rx beam sweeping by the UE 1010 may be avoided. In addition to providing an indication of whether Rx beam refinement is able to be performed in the capability information, the UE 1010 may recommend whether P-3 should be used after receiving the gNB confirmation. The UE 1010 may communicate this information dynamically by higher layer signaling. In response to the higher layer signaling, the gNB 1020 may provide a confirmation of the beamforming reference signals to measure. The gNB 1020 may also determine whether P-2 is to continue to be used.

For the above embodiments, whether a particular beam management procedure is to be enabled may have an impact on the bit width of the beam management reference signal type or beam management process ID. If two beam management procedures are to be used only 1 bit may be sufficient. If all beam management procedures are used, 2 bits may instead be used. Thus, although whether P-2 should be enabled is determined by the beam correspondence and implementation of the gNB 1020, the gNB 1020 may indicate to the UE 1010 higher layer signaling whether P-2 could be used Table 5.2.1.4-1 summarizes one embodiment of triggering or activation of CSI reporting for different CSI-RS configurations. Aperiodic CSI-RS may be used for P-2 when a higher layer parameter CSI-RS-ResourceRep is "OFF" and used for P-3 when CSI-RS-ResourceRep is "ON". Periodic and Semi-Persistent CSI-RS may be used for P-1.

TABLE 5.2.1.4-1

Triggering/Activation of CSI Reporting for CST-RS Configurations

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; Additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally. activation command [10, TS 38.32 1] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The UE may calculate CSI parameters (if reported) assuming the following dependencies between CSI parameters (if reported): LI calculated conditioned on the reported CQI, PMI, RI and CRI, CQI calculated conditioned on the reported PMI, RI and CRI, PMI calculated conditioned on the reported RI and CRI and RI calculated conditioned on the reported CRI.

The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS may be configured by higher layers. Semi-persistent CSI-RS may be activated and deactivated as described in Subclause 5.2.1.5.2 of TS 38.214. Aperiodic CSI-RS may be configured and triggered/activated as described in Subclause 5.2.1.5.1 of TS 38.214.

EXAMPLES

Example 1 is an apparatus of user equipment (UE), the apparatus comprising: processing circuitry arranged to: decode beam management reference signals from a next generation NodeB (gNB), each beam management reference signal associated with a different beam management procedure, decode a beam reporting message after measurement of at least some of the beam management reference signals, the beam reporting message configured to indicate at least one of the beam management procedures; and encode, for transmission to the gNB, a beam report, the beam report comprising beam management reference signal measurements of the at least one of the beam management procedures; and a memory configured to store measurements of the beam management reference signals.

In Example 2, the subject matter of Example 1 includes, wherein: the beam management reference signals comprise Channel State Information-Reference Signals (CSI-RS).

In Example 3, the subject matter of Example 2 includes, wherein the processing circuitry is further configured to: decode, from the gNB, a beam management processes configuration prior to reception of the CSI-RS, the beam management processes configuration configured to provide information about the CST-RS for at least one of the beam management procedures.

In Example 4, the subject matter of Example 3 includes, wherein: the beam management processes configuration comprises, for a CSI-RS process, at least one of a number of symbols, a number of sub-time units within one symbol a transmission mechanism, a number of CSI-RS resources, a number of CSI-RS antenna ports, a number of links, reposting settings, a number of antenna ports per beam, or an interference measurement resource (IMR) setting.

In Example 5, the subject matter of Example 4 includes, wherein: the sub-time units for a CSI-RS of the CSI-RS process comprise at least one of: a number of symbols, a number of repetitions or a value of numerology or subcarrier spacing.

In Example 6, the subject matter of Examples 4-5 includes, wherein: the transmission mechanism indicates whether a CSI-RS is cell-specific, UE-specific or UE-group specific and whether the CSI-RS is periodic or aperiodic.

In Example 7, the subject matter of Examples 2-6 includes, wherein: the beam management processes configuration comprises a default CSI-RS process with at least one of a periodic or cell-specific transmission mechanism.

In Example 8, the subject matter of Examples 1-7 includes, wherein the processing circuitry is further configured to: decode a Downlink Control Information (DCI) of a physical downlink control channel (PDCCH) that triggers transmission of the beam report, the DCI indicating a beam management reference signal or Channel State Information-Reference Signals (CSI-RS) type, a CSI-RS process identification or a slot, subframe or frame index when the CSI-RS for beam management is transmitted, and select a corresponding beam management procedure or CSI-RS process to report a measurement result dependent on the DCI.

In Example 9, the subject matter of Examples 1-8 includes, wherein: the processing circuitry is further configured to decode a Downlink Control Information (DCI) of a physical downlink control channel (PDCCH) that triggers transmission of the beam report, the DCI comprises a bitmap that indicates which beam management procedure or CSI-RS process to target for the beam report, and each bit in the bitmap corresponds to a different beam management process.

In Example 10, the subject matter of Examples 1-9 includes, wherein: the processing circuitry is further configured to decode a Downlink Control Information (DCI) of a physical downlink control channel (PDCCH) that triggers transmission of the beam report, and the DCI comprises an indicator that indicates which of periodic or aperiodic beam management reference signals to target for the beam report.

In Example 11, the subject matter of Example 10 includes, wherein: the beam report comprises a latest set of periodic beam management reference signals or a latest set of aperiodic beam management reference signals, dependent on the indicator.

In Example 12, the subject matter of Examples 1-11 includes, wherein: the processing circuitry is further configured to encode, for transmission to the gNB, a UE capability report prior to reception of the beam management reference signals, the UE capability report comprises beam management capabilities of the UE, and the beam management capabilities of the UE comprise at least one of whether the UE is able to receive the beam management reference signals associated with a particular beam management procedure, a maximum number of beams able to b measured by the UE or a beamforming gain fluctuation among the beam measurement procedures.

In Example 13, the subject matter of Example 12 includes, wherein the processing circuitry is further configured to: encode, for transmission to the gNB via higher layer signaling, an indication of whether the UE intends to engage in beam refinement after the UE capability report indicates that the UE is able to engage in beam refinement.

In Example 14, the subject matter of Examples 1-13 includes, wherein: the processing circuitry comprises a baseband processor configured to encode transmissions to, and decode transmissions from, the gNB.

Example 15 is an apparatus of a next generation evolved NodeB (gNB), the apparatus comprising: processing circuitry arranged to: encode, for transmission to a user equipment (UE), a beam management procedure configuration that provides information about beam management procedures; encode, for transmission to the UE, beam management reference signals associated with the beam management procedures indicated by the beam management procedure configuration; encode, for transmission to the UE, a beam reporting message that indicates at least one of the beam management procedures for the UE to report in a beam report; and decode, from the UE, the beam report, the beam report comprising measurements of the beam management reference signals of the at least one of the beam management procedures; and a memory configured to store measurements of the beam management reference signals received in the beam report.

In Example 16, the subject matter of Example 15 includes, wherein: the beam management processes configuration comprises for a Channel State Information-Reference Signals (CSI-RS) process at least one of: a number of symbols, a number of sub-time units within one symbol, a transmission mechanism, a number of CSI-RS resources, a number of CSI-RS antenna ports, a number of links, reporting settings, a number of antenna ports per beam, or an interference measurement resource (IMR) setting.

In Example 17, the subject matter of Example 16 includes, wherein: the sub-time units for a CSI-RS of the CSI-RS process comprise at least one of a number of symbols, a number of repetitions or a value of numerology or subcarrier spacing.

In Example 18, the subject matter of Examples 16-17 includes, wherein: the transmission mechanism indicates whether a CSI-RS is cell-specific, UE-specific or UE-group specific, and whether the CSI-RS is periodic or aperiodic.

In Example 19, the subject matter of Examples 15-18 includes, wherein: the beam management processes configuration comprises at least one default CSI-RS process with a periodic and cell-specific transmission mechanism.

In Example 20, the subject matter of Examples 15-19 includes, wherein: the processing circuitry is further configured to encode a Downlink Control Information (DCI) of a physical downlink control channel (PDCCH) that triggers transmission of the beam report, and the DCI indicates a beam management reference signal or CSI-RS type, a CSI-RS process identification or a slot, subframe or frame index when the CSI-RS for beam management is transmitted, and the DCI indicates a corresponding beam management procedure or CSI-RS process to report a measurement result.

In Example 21, the subject matter of Examples 15-20 includes, wherein: the processing circuitry is further configured to encode a Downlink Control Information (DCI) of a physical downlink control channel (PDCCH) that triggers transmission of the beam report, the DCI comprises a bitmap that indicates which beam management procedure or CSI-RS process to target for the beam report, and each bit in the bitmap corresponds to a different beam management process.

In Example 22, the subject matter of Examples 15-21 includes, wherein: the processing circuitry is further configured to encode a Downlink Control Information (DCI) of a physical downlink control channel (PDCCH) that triggers transmission of the beam report and the DCI comprises an indicator that indicates which of periodic or aperiodic beam management reference signals to target for the beam report.

In Example 23, the subject matter of Example 22 includes, wherein: the beam report comprises a latest set of periodic beam management reference signals or a latest set of aperiodic beam management reference signals, dependent on the indicator.

In Example 24, the subject matter of Examples 15-23 includes, wherein: the processing circuitry is further configured to decode, from the UE, a UE capability report prior to reception of the beam management reference signals and adjust transmission of the beam management reference signals accordingly, the UE capability report comprises beam management capabilities of the UE, and the beam management capabilities of the UE comprise at least one of whether the UE is able to receive the beam management reference signals associated with a particular beam management procedure, a maximum number of beams able to be measured by the UE or beamforming gain fluctuation among the beam measurement procedures.

In Example 25, the subject matter of Example 24 includes, wherein: the processing circuitry is further configured to decode, from the UE via higher layer signaling, an indication of whether the UE intends to engage in beam refinement after the UE capability report indicates that the UE is able to engage in beam refinement and adjust transmission of the beam management reference signals accordingly.

Example 26 is a computer-readable storage medium that stores instructions for execution by one or more processors of a user equipment (UE), the one or more processors to configure the UE to, when the instructions are executed: receive, from a next generation NodeB (gNB), a beam management processes configuration that provides information about beam management reference signals for at least one of a plurality of beam management procedures; transmit to the gNB an indication of beam management capabilities of the UE; measure the beam management reference signals from the gNB, the beam management reference signals dependent on the beam management capabilities of the UE; receive a beam reporting message that indicates at least one of the beam management procedures to report, and transmit to the gNB, the beam report, the beam report comprising beam management reference signal measurements of the at least one of the beam management procedures.

In Example 27, the subject matter of Example 26 includes, wherein: the instructions, when executed, further configure the UE to transmit to the gNB receive a Downlink Control Information (DCI) of a physical downlink control channel (PDCCH) triggers beam reporting, and at least one of: the DCI indicates a beam management reference signal or Channel State Information-Reference Signals (CSI-RS) type, a CSI-RS process identification or a slot, subframe or frame index, when the CSI-RS for beam management is transmitted, and the instructions, when executed, further configure the UE to select a corresponding beam management procedure or CSI-RS process to report a measurement result dependent on the DCI, or the DCI comprises a bitmap that indicates which beam management procedure or CSI-RS process to target for the beam report, and each bit in the bitmap corresponds to a different beam management process.

In Example 28, the subject matter of Examples 26-27 includes, wherein: the instructions, when executed, further configure the UE to transmit to the gNB receive a Downlink Control Information (DCI) of a physical downlink control channel (PDCCH) triggers beam reporting, the DCI comprises an indicator that indicates which of periodic or aperiodic beam management reference signals to target for the beam report, and the beam report comprises a latest set of periodic beam management reference signals or a latest set of aperiodic beam management reference signals, dependent on the indicator.

In Example 29, the subject matter of Examples 26-28 includes, wherein the instructions, when executed, further configure the UE to transmit to the gNB: a UE capability report that comprises beam management capabilities of the UE, and an indication, via higher layer signaling, of whether the UE intends to engage in beam refinement after the UE capability report indicates that the UE is able to engage in beam refinement.

Example 30 is at least one machine-readable medium including instructions that, when executed by processing circuitry, cause the processing circuitry to perform operations to implement of any of Examples 1-29.

Example 31 is an apparatus comprising means to implement of any of Examples 1-29.

Example 32 is a system to implement of any of Examples 1-29.

Example 33 is a method to implement of any of Examples 1-29.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not so be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features that are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory; and
processing circuitry arranged to, when executing instructions stored in the memory, cause the apparatus to:
determine which of periodic or aperiodic beam management reference signals to target for a beamforming report;
measure the beam management reference signals from a base station based on the determining;
decode a Downlink Control Information (DCI) of a physical downlink control channel (PDCCH) that triggers beam reporting; and
encode, for transmission to the base station, the beamforming report, the beamforming report comprising beam management reference signal measurements of the beam management reference signals.

2. The apparatus of claim 1, wherein the beam management reference signals comprise Channel State Information-Reference Signals (CSI-RS).

3. The apparatus of claim 2, wherein the processing circuitry is further arranged to, when executing instructions stored in the memory, cause the apparatus to:
decode, from the base station, a beam management processes configuration prior to reception of the CSI-RS, wherein the beam management processes configuration is configured to provide information about the CSI-RS for at least one of beam management procedure.

4. The apparatus of claim 3, wherein the beam management processes configuration comprises, for a CSI-RS process, at least one of:
a number of symbols,
a number of sub-time units within one symbol,
a transmission mechanism,
a number of CSI-RS resources,
a number of CSI-RS antenna ports,
reporting settings,
a number of antenna ports per beam, or
an interference measurement resource (IMR) setting.

5. The apparatus of claim 4, wherein the sub-time units within one symbol comprise at least one of:
a number of symbols,
a number of repetitions, or
a value of numerology or subcarrier spacing; and
wherein the transmission mechanism indicates at least whether a CSI-RS is cell-specific, UE-specific, or UE-group specific.

6. The apparatus of claim 5, wherein the transmission mechanism further indicates whether the CSI-RS is periodic or aperiodic.

7. The apparatus of claim 1, wherein the DCI includes a bitmap indicating a beam management procedure or a Channel State Information-Reference Signals (CSI-RS) process to target for beam reporting.

8. The apparatus of claim 7, wherein each bit in the bitmap corresponds to a beam management process.

9. A user equipment (UE), comprising:
a radio; and
processing circuitry coupled to the radio and configured to:
determine which of periodic or aperiodic beam management reference signals to target for a beamforming report;
measure the beam management reference signals from a base station based on the determining;
decode a Downlink Control Information (DCI) of a physical downlink control channel (PDCCH) that triggers beam reporting; and
encode, for transmission to the base station, the beamforming report.

10. The UE of claim 9, wherein the beamforming report comprises beam management reference signal measurements of the beam management reference signals.

11. The UE of claim 9, wherein the beam management reference signals comprise Channel State Information-Reference Signals (CSI-RS).

12. The UE of claim 11, wherein the processing circuitry is further configured to:
decode, from the base station, a beam management processes configuration prior to reception of the CSI-RS, wherein the beam management processes configuration is configured to provide information about the CSI-RS for at least one of beam management procedure.

13. The UE of claim 12, wherein the beam management processes configuration comprises, for a CSI-RS process, at least one of:
a number of symbols,
a number of sub-time units within one symbol,
a transmission mechanism,
a number of CSI-RS resources,
a number of CSI-RS antenna ports,
reporting settings,
a number of antenna ports per beam, or
an interference measurement resource (IMR) setting.

14. The UE of claim 13, wherein the sub-time units within one symbol comprise at least one of:
a number of symbols,
a number of repetitions, or
a value of numerology or subcarrier spacing; and
wherein the transmission mechanism indicates at least whether the CSI-RS is periodic or aperiodic.

15. The UE of claim 13,
wherein the transmission mechanism indicates at least whether a CSI-RS is cell-specific, UE-specific, or UE-group specific.

16. The UE of claim 9,
wherein the DCI includes a bitmap indicating a beam management procedure or a Channel State Information-Reference Signals (CSI-RS) process to target for beam reporting, and wherein each bit in the bitmap corresponds to a beam management process.

17. A non-transitory computer readable memory medium storing instructions executable by processing circuitry of a user equipment (UE) to cause the UE to:
   determine which of periodic or aperiodic beam management reference signals to target for a beamforming report;
   measure the beam management reference signals from a base station based on the determining;
   decode a Downlink Control Information (DCI) of a physical downlink control channel (PDCCH) that triggers beam reporting; and
   encode, for transmission to the base station, the beamforming report.

18. The non-transitory computer readable memory medium of claim 17,
wherein the beamforming report comprises beam management reference signal measurements of the beam management reference signals; and
wherein the beam management reference signals comprise Channel State Information-Reference Signals (CSI-RS).

19. The non-transitory computer readable memory medium of claim 18,
wherein the instructions are further executable by the processing circuitry to cause the UE to:
   decode, from the base station, a beam management processes configuration prior to reception of the CSI-RS, wherein the beam management processes configuration is configured to provide information about the CSI-RS for at least one of beam management procedure; and
wherein the beam management processes configuration comprises, for a CSI-RS process, a transmission mechanism, wherein the transmission mechanism indicates whether the CSI-RS is periodic or aperiodic and whether a CSI-RS is cell-specific, UE-specific, or UE-group specific.

20. The non-transitory computer readable memory medium of claim 17,
wherein the DCI includes a bitmap indicating a beam management procedure or a Channel State Information-Reference Signals (CSI-RS) process to target for beam reporting, and wherein each bit in the bitmap corresponds to a beam management process.

* * * * *